United States Patent [19]

Nagata et al.

[11] Patent Number: 4,869,937

[45] Date of Patent: Sep. 26, 1989

[54] MOLDINGS FOR CAR BODY

[75] Inventors: Takuji Nagata; Akiyoshi Nagano, both of Aichi, Japan

[73] Assignee: Toyoda Gosei Co., Ltd., Nishikasugai, Japan

[21] Appl. No.: 237,062

[22] Filed: Aug. 29, 1988

[30] Foreign Application Priority Data

Oct. 31, 1987 [JP] Japan .................................. 62-167191

[51] Int. Cl.⁴ ............................................. B60R 13/04
[52] U.S. Cl. ....................................... 428/31; 52/716; 293/128
[58] Field of Search ........................... 24/289; 52/716; 293/128; 428/31

[56] References Cited

U.S. PATENT DOCUMENTS

| | | | |
|---|---|---|---|
| 3,494,244 | 2/1970 | Wayland | 428/31 X |
| 3,572,799 | 3/1971 | Truesdell et al. | 428/31 X |
| 4,163,076 | 7/1979 | Katoh | 428/31 X |
| 4,592,937 | 6/1986 | Nagata et al. | 428/31 |

FOREIGN PATENT DOCUMENTS 59-19639  6/1984  Japan .................................. 428/31

Primary Examiner—Henry F. Epstein
Attorney, Agent, or Firm—Cushman, Darby & Cushman

[57] ABSTRACT

A molding to be attached to either side or the like of a car body comprising a molding main member with a metallic insert provided on the back side of the molding main member, a plurality of separate retainers made of resin are fitted in the insert at different positions and a plurality of fixing members which are adapted to fix the molding main member to the car body are coupled to the retainers.

4 Claims, 3 Drawing Sheets

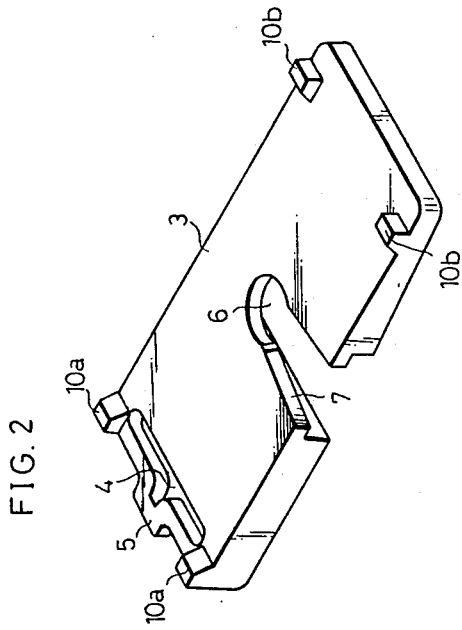
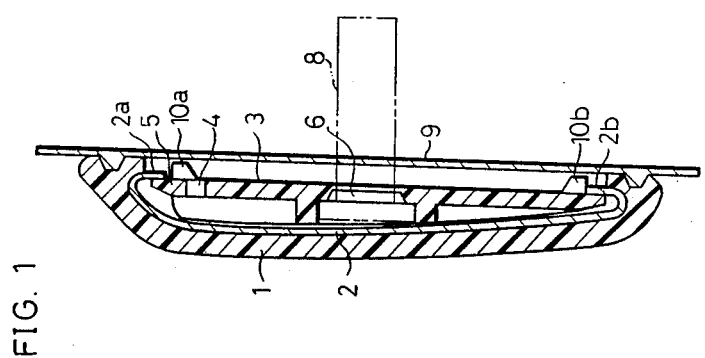
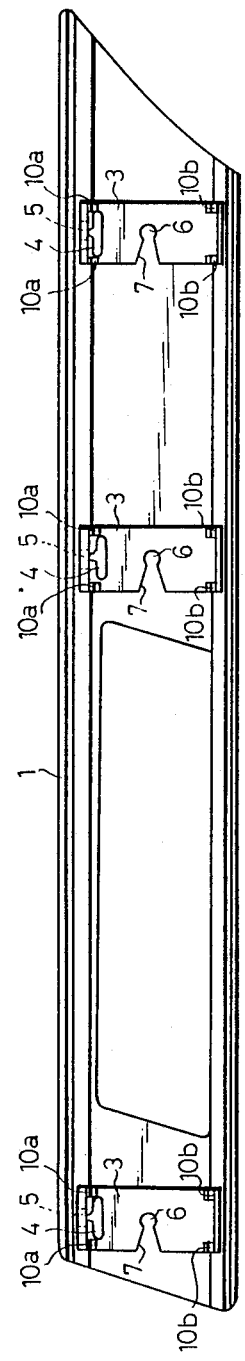

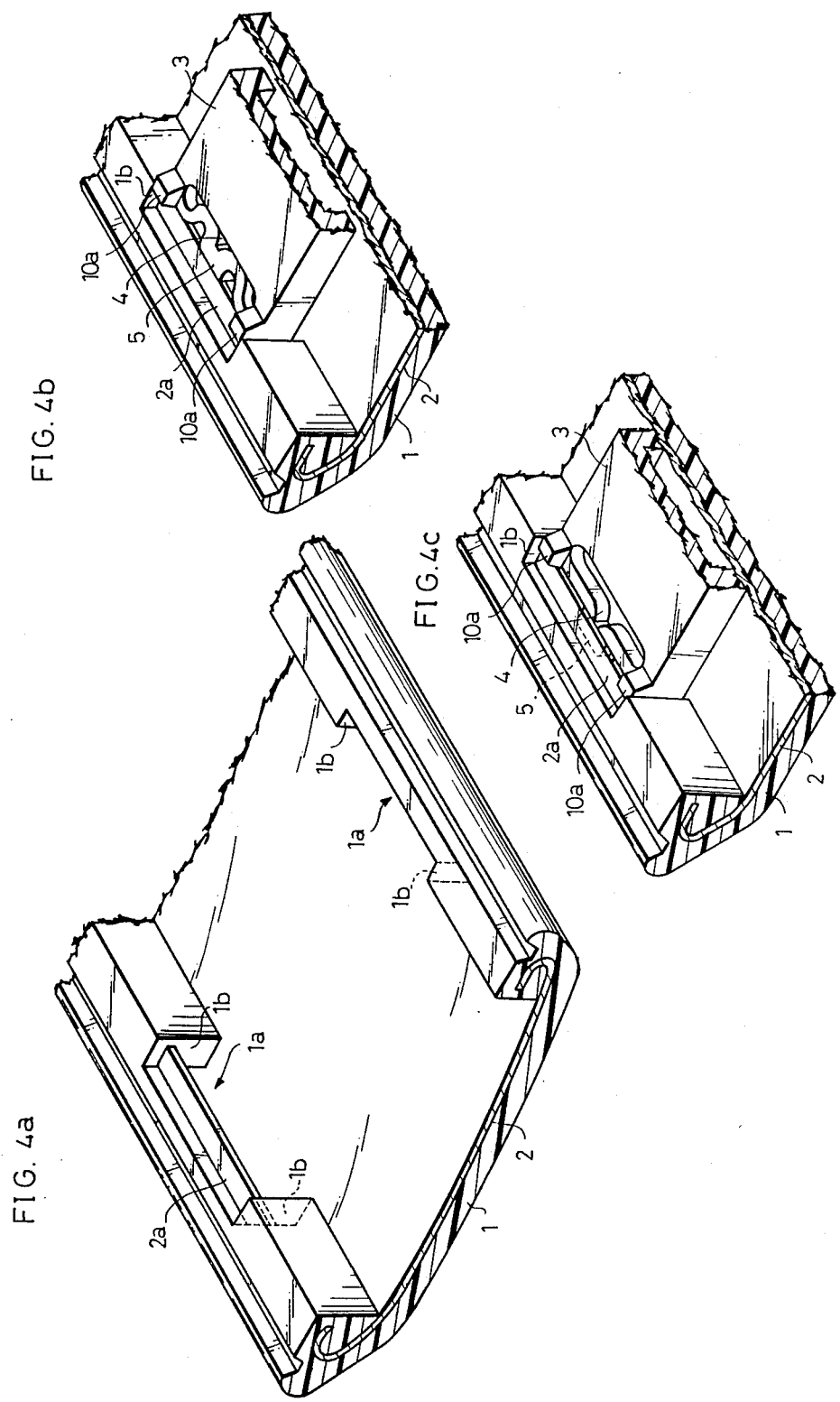

MOLDINGS FOR CAR BODY

BACKGROUND OF THE INVENTION

1. Field of the Invention

This invention relates to a molding which is attached to either side or the like of a car body.

2. Description of the Related Art

A conventional molding which is attached to either side or the like of a car body is configured as shown in FIG. 9 in which a molding main member 21 and retainers 22 are molded integrally together with synthetic resin (see Japanese Utility Model Publication No. 59-19639).

In this type of molding, however, there is a variation in the amount of thermal shrinkage after molding in the molding main member 21 because its thickness is not uniform. Consequently, the surface of a portion of the molding main member 21 corresponding to each retainer 22 collapses to exhibit a so-called sink mark H (shown by the two-dot chain line in FIG. 9), this tending to degrade the appearance of the molding main member. Further, a slide core must be used in connection with the retainers in the process of fabricating the molding. Consequently, the configuration of a metal mold becomes complicated, therefore causing the manufacturing cost disadvantageously high. Further, this type of molding is fabricated using synthetic resin alone. Therefore, after being attached to the car body, the molding main member 21 tends to exhibit thermal deformation (a warp) in the lengthwise direction thereof owing to the difference in the rate of thermal expansion between the car body (metal) and the molding (synthetic resin).

In view of the foregoing related art, there is a different proposal, as shown in FIG. 10, to fabricate the molding main member 21 through injection molding or by injecting synthetic resin onto the surface of an insert 23, made of a metal having a rate of thermal expansion substantially identical with that of the car body, so as to result in a substantially uniform thickness. This proposal intends to eliminate a variation in the amount of thermal shrinkage due to the non-uniformity in thickness of the synthetic resin of the molding main member 21, thereby avoiding the formation of the sink marks H on the surface of the molding main member 21, and to suppress the occurrence of thermal deformation in the lengthwise direction of the molding main member 21 due to a difference in the rate of thermal expansion.

However, even according to the foregoing proposal, the retainers must be provided in an under section of the insert 23. If this type of molding is fabricated through injection molding with synthetic resin, with the retainers previously secured to or disposed in the under section of the insert 23, so as to result in an integral member, it is difficult to remove burrs of synthetic resin formed around the retainers during the injection molding with synthetic resin, the configuration of the metal mold becomes complicated, and the cost of manufacturing of the molding increases.

SUMMARY OF THE INVENTION

It is an object of the present invention to provide a molding which suppresses the occurrence of thermal deformation in the lengthwise direction of a molding main member due to a variation in the rate of thermal expansion, prevents the appearance of the molding from becoming inferior by avoiding the formation of sink marks, makes it possible to remove burrs of synthetic resin even if a metal mold of simplified configuration is used, and can be fabricated at low cost.

It is another object of the present invention to provide a molding which is configured so that separate retainers can be easily fitted to given portions of a metallic insert provided on the back side of a molding main member through one-touch action, and which is easily attached to a car body.

To achieve the foregoing objects, the present invention provides a molding which comprises a molding main member, a metallic insert provided on the back side of the molding main member, a plurality of separate retainers made of resin which are fitted in the insert at different positions, and a plurality of fixing members coupled to the retainers for fixing the molding main member to a car body.

Other objects of the present invention will become apparent upon understanding the embodiments hereinafter described and will be indicated clearly in the appended claims. Various advantages not referred to herein will occur to those skilled in the art upon practicing the present invention.

BRIEF DESCRIPTION OF THE DRAWINGS

FIGS. 1 through 8 show embodiments of the present invention in which

FIG. 1 is a sectional view showing a mechansim of attaching a molding;

FIG. 2 is a perspective view showing a retainer;

FIG. 3 is a back view showing a mechanism of fitting the retainer;

FIG. 4(a) is a fragmentary perspective view showing the back side of the molding;

FIGS. 4(b) and 4(c) are fragmentary perspective views showing the mechanism of fitting the retainer to a molding main member;

FIG. 6 is a front view showing a clip; and

FIGS. 7 and 8 are fragmentary front views showing modifications of a convex portion of the retainer;

DETAILED DESCRIPTION OF THE PREFERRED EMBODIMENTS

Figure 5A:
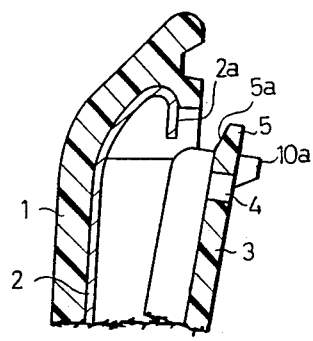
FIGS. 5(a), 5(b) and 5(c) are fragmentary sectional views showing an important portion of the mechanism of fitting the retainer to the molding main member.

An embodiment of the present invention embodied in the form of a molding, which is attached to either side of a car, will now be described with reference to FIGS. 1 through 5(c).

As shown in FIG. 1, a metallic insert 2 having U-shaped bent portions 2a and 2b at the upper and lower ends thereof is provided on the back side of a curved molding main member 1 made of soft vinyl chloride resin. This molding main member 1 can be easily fabricated by supporting the entire back side of the insert 2 shown in FIG. 1 by means of a lower metal mold and performing injection molding with respect to the front side of the insert using soft vinyl chloride resin. The back side of the molding main member 1 has notches 1a in upper and lower edge portions thereof as shown in FIG. 4(a). The insert 2 is exposed in each space defined by the lateral end faces 1b of each notch 1a. A separately-molded retainer 3 made of polyacetal resin (POM) is fitted in the notches 1a of each pair as shown in FIG. 1.

As shown in FIG. 2, the retainer 3 has a slot 4 in an upper section thereof so that a convex portion 5 located at the upper end of the retainer has spring resiliency and is adapted to retract toward the slot 4. The retainer 3 further has a circular hole 6 in a central portion thereof whose circumference is notched so that this hole is in communication with a tapered cutout groove 7. Accordingly, a bolt 8 serving as a fixing member can be inserted into the hole 6 as shown in FIG. 1, this bolt 8 being fixed to a car body 9. The retainer 3 further has trapezoidal stoppers 10a formed integrally in upper corner portions thereof and similar trapezoidal stoppers 10b formed integrally in lower corner portions thereof. Therefore, as shown in FIG. 1, the lower end of the retainer 3 is positioned by the abutment of the stoppers 10b on the bent portion 2b in the lower section of the insert 2. Similarly, the upper end of the retainer 3 is positioned by the abutment of the stoppers 10a on the bent portion 2a in the upper section of the insert 2. Further, the lateral movement of the retainer 3 is restricted by the lateral end faces 1b vertically aligned of the molding main member 1 as shown in FIGS. 4(a) and 4(c).

The retainer 3 of the foregoing configuration is provided at three positions spaced from one another laterally (in the front-rear direction of the car) as shown in FIG. 3.

The way to fit the retainer 3 in the insert 2 will now be described.

First, insert the lower end of the retainer 3 into the bent portion 2b in the lower section of the insert 2 from the back side of the insert 2 to abut the stoppers 10b in the lower corner portions of the retainer 3 on the edge of the bent portion 2b of the insert 2.

Figure 5B:
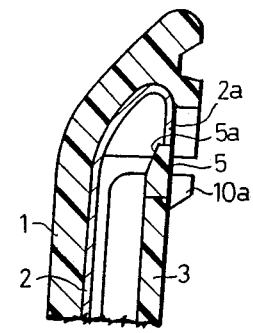
Figure 5C:
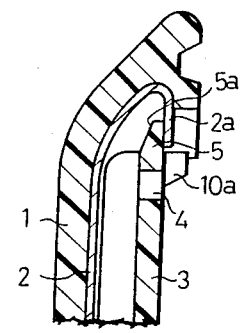

Then, bring the upper end of the retainer 3 close to the bent portion 2a of the insert 2, as shown in FIG. 5(a), to abut an incline 5a of the convex portion 5 of the retainer 3 on the edge of the bent portion 2a of the insert 2. Then, push the convex portion 5 downward so that it gradually retracts toward the slot 4. As a result, as shown in FIG. 5(b) or 4(b), the upper end face of the convex portion 5 abuts on the edge of the bent portion 2a of the insert 2. Then, push the retainer 3 into the bent portion 2a of the insert 2; as a result, the convex portion 5 of the retainer 3 is freed from the force of the bent portion 2a, so that the convex portion 5 returns from the position where it is confined to the slot 4 to its initial position by virtue of its resiliency. Consequently, the state shown in FIG. 5(c) or 4(c) is reached.

In this state, because the convex portion 5 of the retainer 3 is engaged with the bent portion 2a of the insert 2, the retainer 3 is prevented from coming off toward the car body 9. Further, because the lateral movement of the retainer 3 is restricted by the end faces 1b of the molding main member 1, the retainer is prevented from shifting from the thus attained position.

As described above, the convex portion 5 of the retainer 3 can be easily fitted in the bent portion 2a of the insert 2 through one-touch action by pushing the retainer 3 from the side of the car body 9 toward the front side of the molding main member 1.

The function and effect of the molding configured as above will now be described.

Each separate retainer 3 made of POM is fitted in the metallic insert 2 provided integrally on the back side of the molding main member 1 through one-touch action in accordance with the foregoing way of engagement. Then, insert each bolt 8 into the hole 6 through the cutout groove 7 of each retainer 3, and fix each bolt to a given portion of the side surface of the car body 9. As a result, the molding main member 1 is attached to the car body 9, thereby resulting in the state shown in FIG. 1. In the embodiment, as shown in FIG. 3, there are three retainers 3 mounted.

As will be apparent, because the molding main member 1 is provided integrally with the metallic insert 2 whose rate of thermal expansion is substantially identical with that of the car body 9, the thermal deformation in the lengthwise direction, that would otherwise appear due to the difference in the rate of thermal expansion between the molding main member 1 and the car body 9 after the molding main member 1 is attached to the car body 9, is suppressed.

Further, because the thickness of synthetic resin provided on the surface of the molding main member 1 is substantially uniform, no sink mark appears at the position corresponding to each retainer 3, so that the appearance of the molding is not degraded. In addition, a metal mold of simplified configuration can be used in fabricating the molding. The reason is because there is no need for a complicated deburring mechanism in the present invention, such as a slide core which was needed in the prior art because the retainers 22 were formed or injection molded integrally with the molding main member 21 or the insert 23, hence they had to be subjected to deburring.

The present invention should not be limited to the foregoing embodiment, and can be modified as follows.

Figure 6:
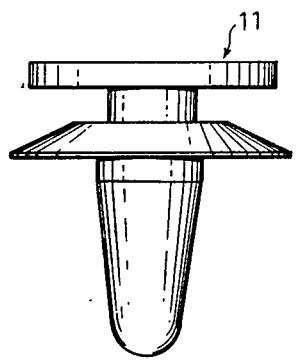

(1) Although the retainers 3 and the car body 9 are joined together using the bolts 8 in the embodiment, these bolts may be replaced with coupling members which can be inserted in the holes 6 of the retainers 3 and can fix the retainers 3 to the car body 9. For example, a clip 11 made of synthetic resin shown in FIG. 6 may be substituted which achieves fixing easily.

Figure 7:
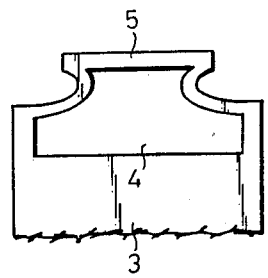
Figure 8:
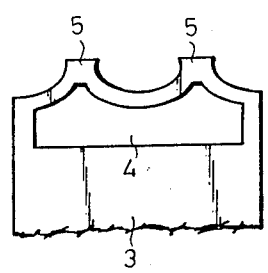
Figure 9:
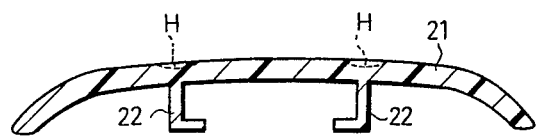
FIG. 9 is a sectional view showing a conventional molding.
Figure 10:
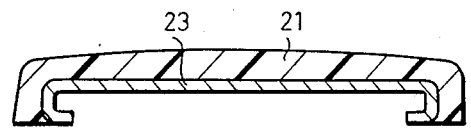
FIG. 10 is a sectional view showing an imaginary molding proposed to overcome the drawbacks of the conventional molding.

(2) Although the convex portion 5 having spring resiliency is provided in the upper end portion of each retainer 3 in the embodiment, this convex portion may be provided in the lower end portion conversely. Further, as shown in FIG. 7, the convex portion 5 may be changed to a shape in which a comparatively-long lock section 5 is provided in a central portion with both side sections defining curved resilient sections. In this case, the engagement between the lock section 5 and the bent portion 2a of the insert 2 becomes more reliable. Further, as shown in FIG. 8, there may be provided two sharp convex sections 5 per retainer. In this case, also, the engagement between the convex sections 5 and the bent portion 2a of the insert is reliable.

As described above, according to the molding of the present invention, the metallic insert is molded integrally on the back side of the molding main member; hence, the thermal deformation in the lengthwise direction of the molding main member is suppressed. Further, the thickness of synthetic resin provided on the surface of the molding main member is made substantially uniform; hence, no sink marks appears at the position corresponding to each retainer, so that the appearance is not degraded. Further, the retainers are molded independent of the molding main member; hence, the slide core is not needed in fabricating the molding, thereby allowing use of the metal mold of simplified configuration.

What is claimed is:

1. A molding for a car body comprising:

a molding main member of synthetic resin having front and rear sides and rearwardly thickened edge portions with opposed notches therein, said body being of substantially uniform thickness between said edge portions and being formed by injection molding;

a metallic insert integrally installed on said rear side of said main member during the molding process, said insert having bent portions along both edges thereof imbedded in said thickened portions, said bent portions being folded rearward to form opposed flanges exposed in said notches;

a retainer made of resin formed separately from said member and having opposed end portions one of which is endwise resilient, said end portions being engaged beneath said flanges to retain said retainer on said member, the width of said end portions being slightly less than the length of said notches and having rearward extending stopper means to engage the edges of said flanges; and a fixing member fittable into a hole in said retainer to fix with molding main member to a car body.

2. A molding according to claim 1, wherein a slot extends from a side edge of said retainer to the hole therein, and said fixing member is a clip made of synthetic resin and having an enlarged head portion, a flange portion and a neck portion therebetween, said neck portion being inserted through said slot to be received in said hole, whereby said head portion is received between said retainer and said main member with said flange portion engaged between said retainer and a car body, and said clip further having an enlarged resilient tip portion fittable into the hole in the car body to retain the molding thereon.

3. A molding according to claim 1, wherein the resilient end portion of the retainer has a flange engaging portion centrally of said end portion and an opening rearwardly thereof to provide resiliency to said end portion.

4. A molding according to claim 1, wherein the resilient end portion of the retainer has a pair of resilient flange engaging with an opening rearwardly thereof to provide resiliency to said end portion.

* * * * *